(12) United States Patent
Willis et al.

(10) Patent No.: US 8,218,174 B2
(45) Date of Patent: Jul. 10, 2012

(54) INTERACTIVE DEVICE CAPACITY MIMIC AND SYSTEM OVERRIDE

(75) Inventors: Keith L. Willis, Rochester, NY (US); Marc J. Krolczyk, Spencerport, NY (US)

(73) Assignee: Xerox Corporation, Stamford, CT (US)

( * ) Notice: Subject to any disclaimer, the term of this patent is extended or adjusted under 35 U.S.C. 154(b) by 1048 days.

(21) Appl. No.: 11/763,771

(22) Filed: Jun. 15, 2007

(65) Prior Publication Data

US 2008/0309964 A1    Dec. 18, 2008

(51) Int. Cl.
*G06F 3/12* (2006.01)
*G06K 15/00* (2006.01)

(52) U.S. Cl. ............... 358/1.15; 358/1.13; 358/1.14; 358/1.16; 399/8; 399/24; 399/43

(58) Field of Classification Search ........... 358/404, 358/1.13–1.16; 715/273, 274, 277, 736, 715/772; 399/8, 9, 24, 43
See application file for complete search history.

(56) References Cited

U.S. PATENT DOCUMENTS

| | | | | |
|---|---|---|---|---|
| 5,287,194 A * | 2/1994 | Lobiondo | .................. | 358/296 |
| 5,636,032 A * | 6/1997 | Springett | .................. | 358/296 |
| 5,978,559 A | 11/1999 | Quinion | | |
| 6,748,183 B2 * | 6/2004 | Edmonds | .................. | 399/23 |
| 6,865,354 B2 * | 3/2005 | Jackelen et al. | .......... | 399/81 |
| 6,906,819 B2 * | 6/2005 | Katsuda et al. | .......... | 358/1.15 |
| 6,970,261 B1 * | 11/2005 | Robles | .................. | 358/1.15 |
| 7,031,014 B2 * | 4/2006 | Ohwa | .................. | 358/1.18 |
| 7,061,636 B2 * | 6/2006 | Ryan et al. | .......... | 358/1.15 |
| 7,265,860 B2 * | 9/2007 | Ferlitsch | .......... | 358/1.15 |
| 7,443,529 B2 * | 10/2008 | Ferlitsch | .......... | 358/1.15 |
| 7,595,903 B2 * | 9/2009 | Kizaki et al. | .......... | 358/1.15 |
| 8,102,549 B2 * | 1/2012 | Morales et al. | .......... | 358/1.15 |
| 2005/0099649 A1 * | 5/2005 | Ferlitsch et al. | .......... | 358/1.15 |

\* cited by examiner

*Primary Examiner* — Twyler Haskins
*Assistant Examiner* — Dennis Dicker
(74) *Attorney, Agent, or Firm* — Oliff & Berridge, PLC

(57) ABSTRACT

Displays are provided for a graphical user interface including a device capacity mimic in a job manager in a system, such as a xerographic machine. The displays include a visual representation of the available capacity of each of a number of devices for the system, such as each output destination for a printer with multiple output destinations. The device capacity mimic shows the effect of jobs in progress on the available capacity, each job consuming a portion of the available capacity. Using this mimic, the user may, for example, revise the destination of jobs that have been planned but not yet started (e.g., by dragging the job). A mimic view of this information with a graphical user interface for managing the device assignments is provided. Thus, a user may not only view information about the device assignments for jobs, but also control or manage the device assignments for jobs.

16 Claims, 7 Drawing Sheets

INTERACTIVE DEVICE CAPACITY MIMIC AND SYSTEM OVERRIDE

BACKGROUND

This disclosure generally relates to digital imaging systems architecture and specifically relates to industrial design for machines, such as printers, copiers and other systems.

Many imaging machines have multiple devices performing the same functions, such as, for example, production presses. Production presses are often used to produce, for example, full-color books, personalized marketing brochures, financial statements and other kinds of jobs. A job is one or more sheets of media being processed together (e.g., the pages of a book) by the machine. Multiple devices performing the same functions are often available on production presses because these machines typically run at a high speed with a high volume of input and output. Production presses often have multiple devices performing the same functions, including, for example, multiple input modules (e.g., feeders), multiple output modules (e.g., stackers), and multiple finishers (e.g., booklet makers, staplers). Some machines with multiple devices performing the same functions have an auto-switch mode whereby jobs being processed by the machine are automatically distributed among the multiple devices. Furthermore, a given job may be split among multiple devices.

In the case of a job split among two or more finishers, the user (or machine operator) must retrieve the job from all the finishers, which may require tediously sorting through other jobs in multiple output trays just to find the user's job. This is especially daunting on high volume machines where it is not unusual for finishers to output 3,000 to 5,000 sheets. Currently, the user is powerless to avoid this situation. After the user submits the job, there is no feedback from the machine to tell the user to which of the multiple devices the machine assigned the job. Users of such machines do not know when a job is at risk of being split across multiple devices and there is no way to prevent it from occurring. In addition, once the job has been submitted and assigned to one or more output destinations by the system, users have no way of re-routing the job to alternate output destinations.

SUMMARY

One exemplary embodiment is a method for mimicking device capacity in at least two devices that perform the same function. The available capacity information is obtained for each of the devices. This available capacity information includes the system assignment of a job. The job may be a pending job in a queue and the available capacity information may include one or more active jobs and the other pending jobs in the queue. The job assignment is overridden by re-assigning the job to at least one of the devices. For example, a job that was split among multiple devices may be re-assigned to a single device. The capacity information may be updated to show the effect the user override would have before actually performing the user override. The available capacity information may be provided at a job view level and may be updated substantially in real-time. The devices may be output devices, such as finishers in a xerographic machine. Another aspect is a computer readable medium storing instructions on a storage medium for performing this method.

Another exemplary embodiment is a system for mimicking device capacity in at least two devices that perform the same function. The system includes a user interface that has a display for providing available capacity information for each of the devices, including how the job was automatically assigned. There is an override on the display for assigning the job to at least one of the devices, overriding the automatic assignment of the job. The override may manually assign the job. The capacity information may be updated on the display to show an effect of the override. The available capacity information may be provided at a job view level and updated substantially in real-time. The devices may be output devices, such as finishers in a xerographic machine.

EMBODIMENTS

Figure 1:
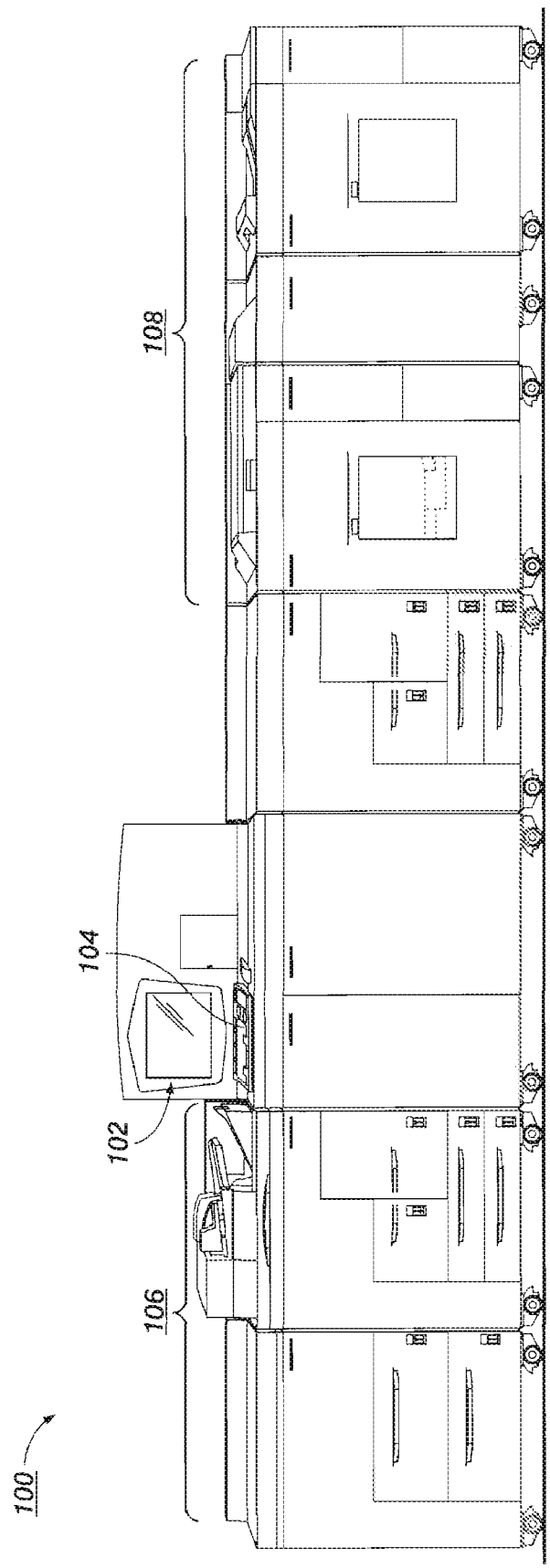
FIG. 1 illustrates an exemplary embodiment of a system having multiple devices for performing the same functions.

FIG. 1 illustrates an exemplary embodiment of a system 100 having multiple devices for performing the same functions. The system 100 is a xerographic machine, such as a production press. Production presses are high speed and high volume machines that are used to create books, personalized marketing brochures, financial statements and the like. The system 100 includes a display device 102, such as a monitor, input devices 104, such as a keyboard and mouse, feeders 106, and stackers 108. The system 100 also includes a storage device (not shown) for storing instructions for a user interface for the display device 102 to be executed on a processor (not shown). Other embodiments of system 100 may include any number of feeders and stackers; e.g., one embodiment includes up to six feeders and up to four stackers. The system 100 has a dual feeder configuration with two high capacity input trays (i.e., feeders 106) that may hold up to 2,500 sheets. The system 100 has a dual finisher configuration with two high capacity output trays (i.e., stackers 108) that may hold up to 3,000 sheets.

The display device 102 includes many display views, such as a job view showing the pending jobs. Exemplary embodiments enable a user to view anticipated output destinations of a job relative to other pending jobs in a queue (e.g., print queue), after the user's job has been submitted. One embodiment is a job view for the user to view information about the device assignment (e.g., output destination) of current jobs. The system determines the device assignment for a job based on a number of factors. For example, a production machine may determine output destinations based on factors, such as sheet counts, scheduled jobs and available capacity of the output destinations. Other embodiments of display views may include user interfaces appealing to any of the senses, such as seeing, touch, hearing and the like, so long, as the information is conveyed and interactive functionality is made available to the user.

Figure 2:
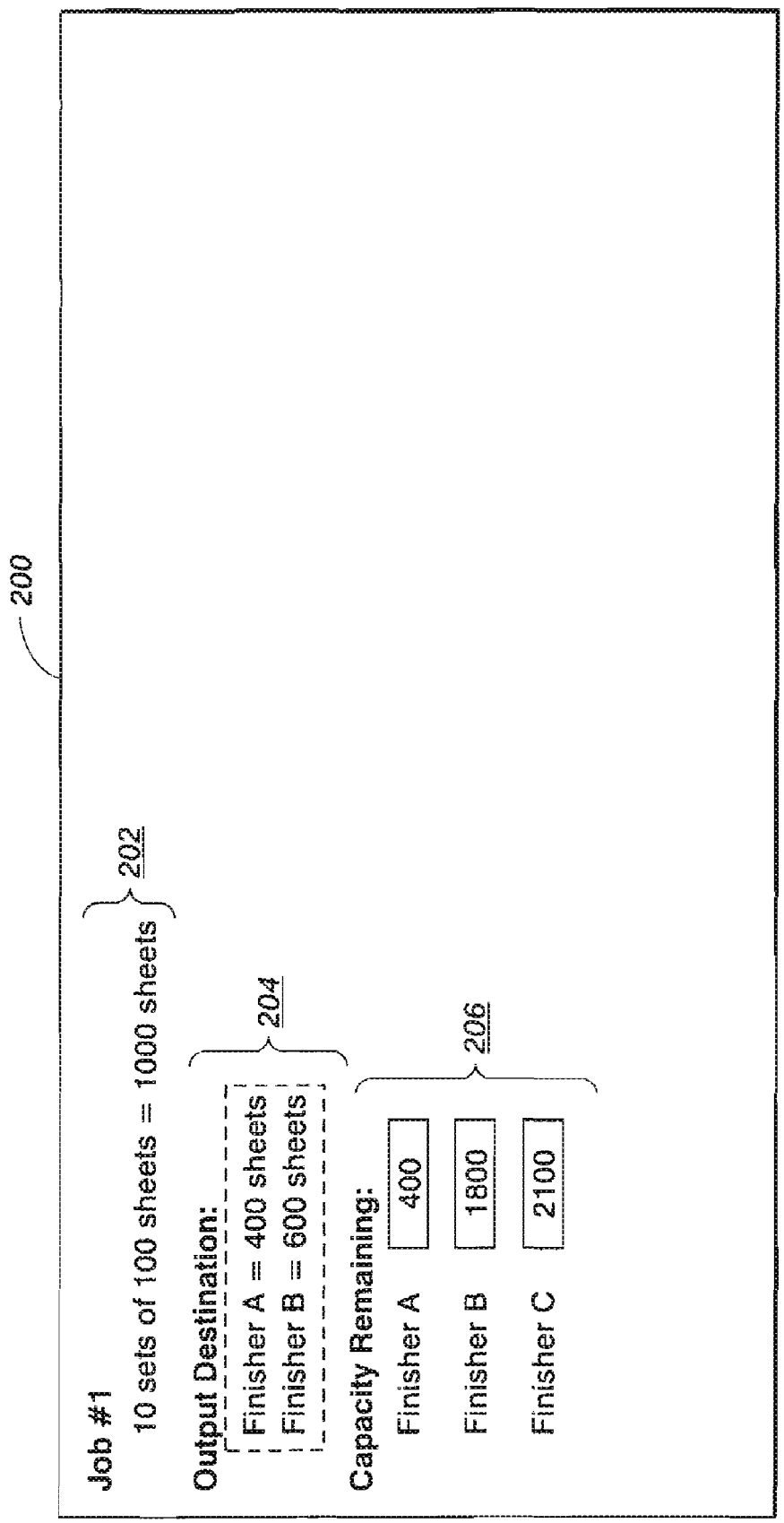
FIG. 2 illustrates an exemplary embodiment of a job view display.

FIG. 2 illustrates an exemplary embodiment of a job view display 200. In this example, the job view display 200 includes user job information 202, output destination information 204, and capacity information 206. The user job information 202 indicates that job number one (i.e., the job submitted by the user) is a 1,000 sheet job (i.e., 10 sets of 100 sheets each). The 1,000 sheet job is exemplary and is used to describe the features of an exemplary embodiment. It will be appreciated that any number of sheets could be used and one skilled in the art would understand that any number could be used in connection with the described exemplary embodiments.

The output destination information 204 indicates that the first 400 sheets of the user's job are scheduled for finisher A and the remaining 600 sheets are scheduled for finisher B. In one embodiment, the job view display 200 continues to be updated as events occur (e.g., jobs completing) in substantially real time. In one embodiment, the job view display 200 is updated when the user submits a job.

Exemplary embodiments of the job view display 200 are not limited to any particular display or arrangement of information, but rather are generally directed to a method of providing information to enable the user to manage jobs in a way that may be different from how the system automatically manages the jobs. One embodiment of the job view display 200 enables the user to change the scheduled output destination while the user's job is in the queue. The job view display 200 may include a variable level of detail and various properties for each output destination device associated with the system. For example, in FIG. 2, the user is able to view the current output capacity of three finishers that are physically connected to the system. The user may also be able to track whether the user's job will be split between two or more finishers. For example, in FIG. 2, the user is informed that job number one is split between finisher A and finisher B.

Figure 3:
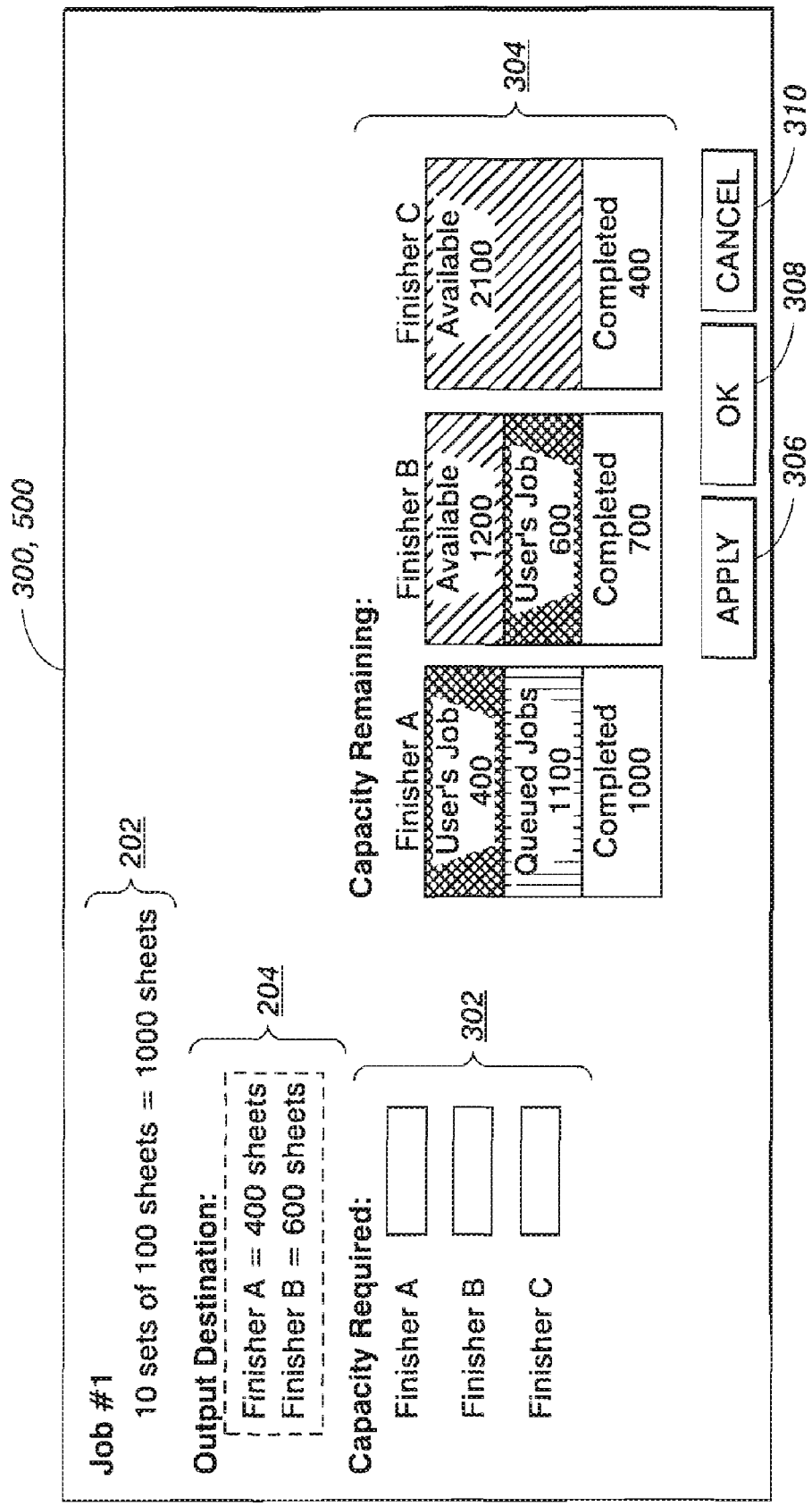
FIGS. 3 and 4 illustrate an exemplary embodiment of an override display.
Figure 4:
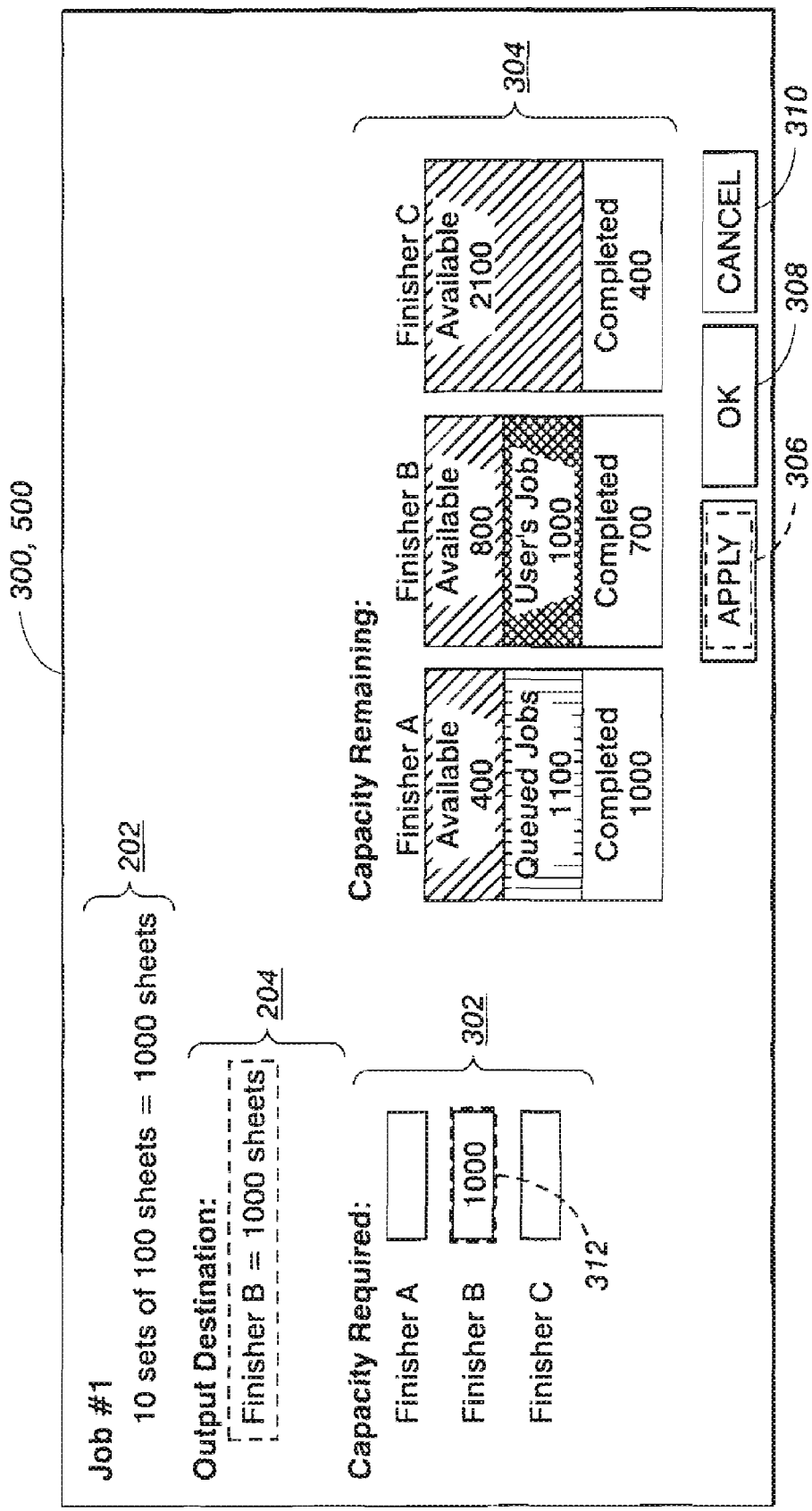

FIGS. 3 and 4 illustrate an exemplary embodiment of an override display 300. The override display 300 is a mimic presentation of finisher capacity details at a job view level for a system. A mimic presentation is a kind of simulation, model or representation of a current state or characteristics of aspects of a machine, such as finisher capacity for the three finishers in the system in this example. The mimic presentation may be substantially in real time. The mimic presentation may be any kind of presentation, such as video or animation. Other embodiments of the override display 300 may include mimic presentations of other kinds of devices in a system, such as feeders. A job view level provides a level of detail that enables a user to identify particular jobs in order to make decisions about managing the jobs among the multiple devices in the system. In FIG. 3, the display information relates to job number one, which is listed in the job information 202 which is scheduled to be split between two finishers, as shown in the output destination information 204. In one embodiment, the user may select a job from a number of jobs for the override display 300 so that the override display 300 updates to display information related to the selected job.

The override display 300 includes capacity required information 302 and capacity remaining information 304. The capacity required information 302 includes receiving user input for reassigning a desired number of sheets of the job listed in the job information 202 to various available finishers. The capacity remaining information 304 includes information about available capacity, queued jobs, completed jobs and the like.

In FIG. 3, the user submits, for example, a 1,000 sheet job consisting of 10 sets of 100 sheets to the system, which has three finishers, namely finisher A, finisher B and finisher C. As discussed above, the 1,000 sheet job is exemplary and used merely as an example. Any size job could be used in accordance with exemplary embodiments. After submission, this information is reflected on the override display 300. When the system splits the user's job between finisher A and finisher B (i.e., 400 sheets to finisher A and 600 sheets to finisher B), this information is reflected on the override display 300. Upon seeing that the job was split, the user may want to re-route or override the system determined output destinations so that all of the output is sent to finisher B to avoid having to sort through the output of two different finishers to retrieve the finished job.

In FIG. 4, from the job level view of the override display 300, the user chooses to have the user's job sent to finisher B by typing in 1,000 sheets for finisher B 312 and selecting the apply button 306 and the ok button 308. In this example, the apply button 306 shows the effect that the change would have, the ok button 308 makes the change take place, and the cancel button 310 eliminates anything previously applied, but other displays with any other kind of user controls may be used. After selecting the apply button 306 or the ok button 308, the job level view of the override display 300 reflects the change in output destination from finishers A and B to finisher B in the capacity remaining information 304. In one embodiment, the system may check and/or correct for errors (e.g., the user assigns more or less sheets than are in the job). In response to an error, error messages may be displayed or the system may determine job workflow again (e.g., splitting the job again) based on the current conditions.

In this way, the user is provided with an option to override or re-route the scheduled finishing destination of the user's job that the system split between finishers in order to consolidate the job to one finisher, if desired. Once the job is consolidated to one finisher, the user may retrieve the entire job from one finisher as opposed to multiple finishers. This maintains job integrity and increases productivity by avoiding having to sort through and unload output from multiple finishers. Of course, a job may be intentionally or automatically distributed across finishers, if desired, as well. In other embodiments where attributes other than finisher capacity are mimicked, it may be desirable to override the system assignment of a job in other ways.

Figure 5:
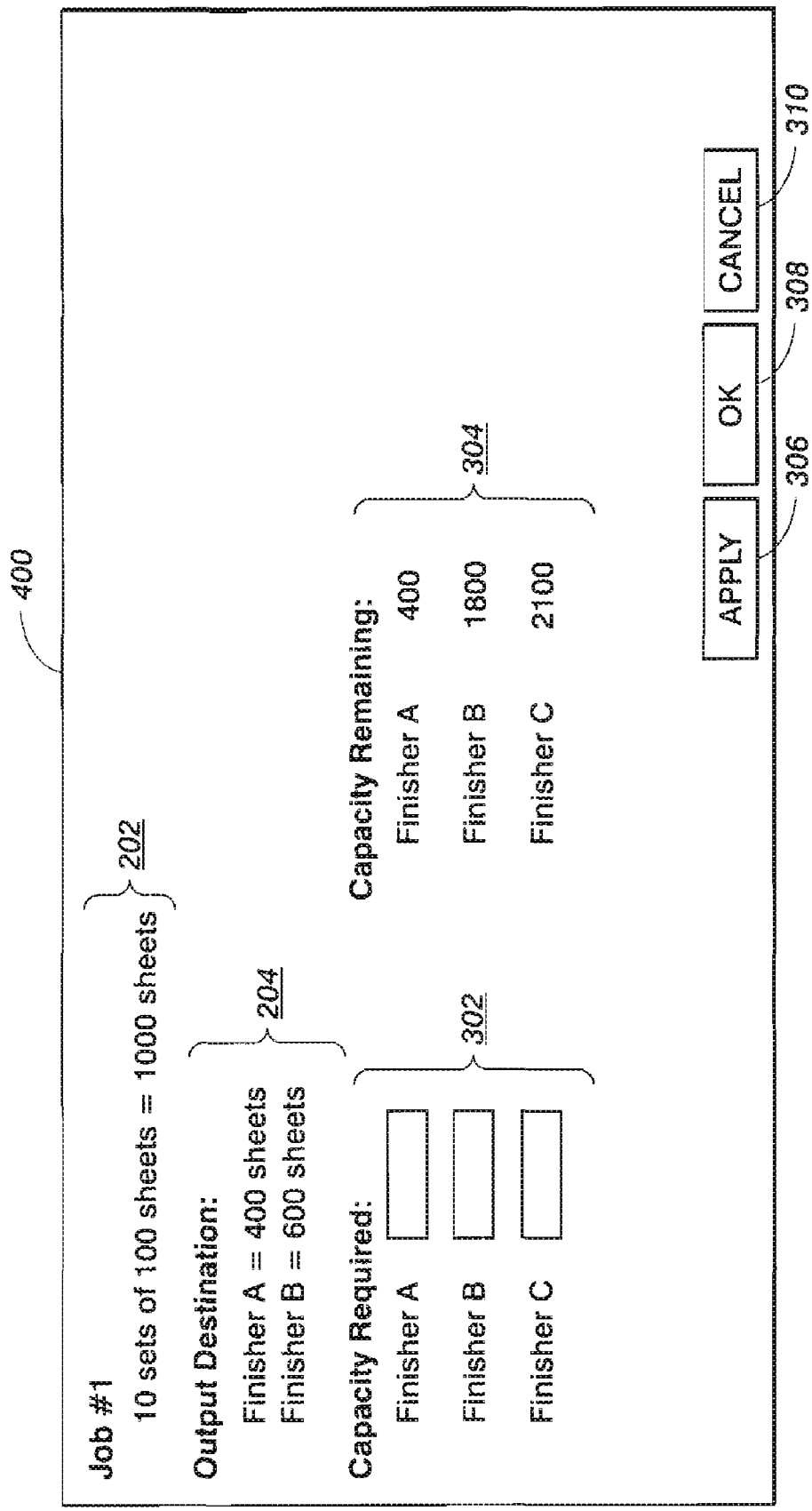
FIGS. 5 and 6 illustrate another exemplary embodiment of a job view level display.
Figure 6:
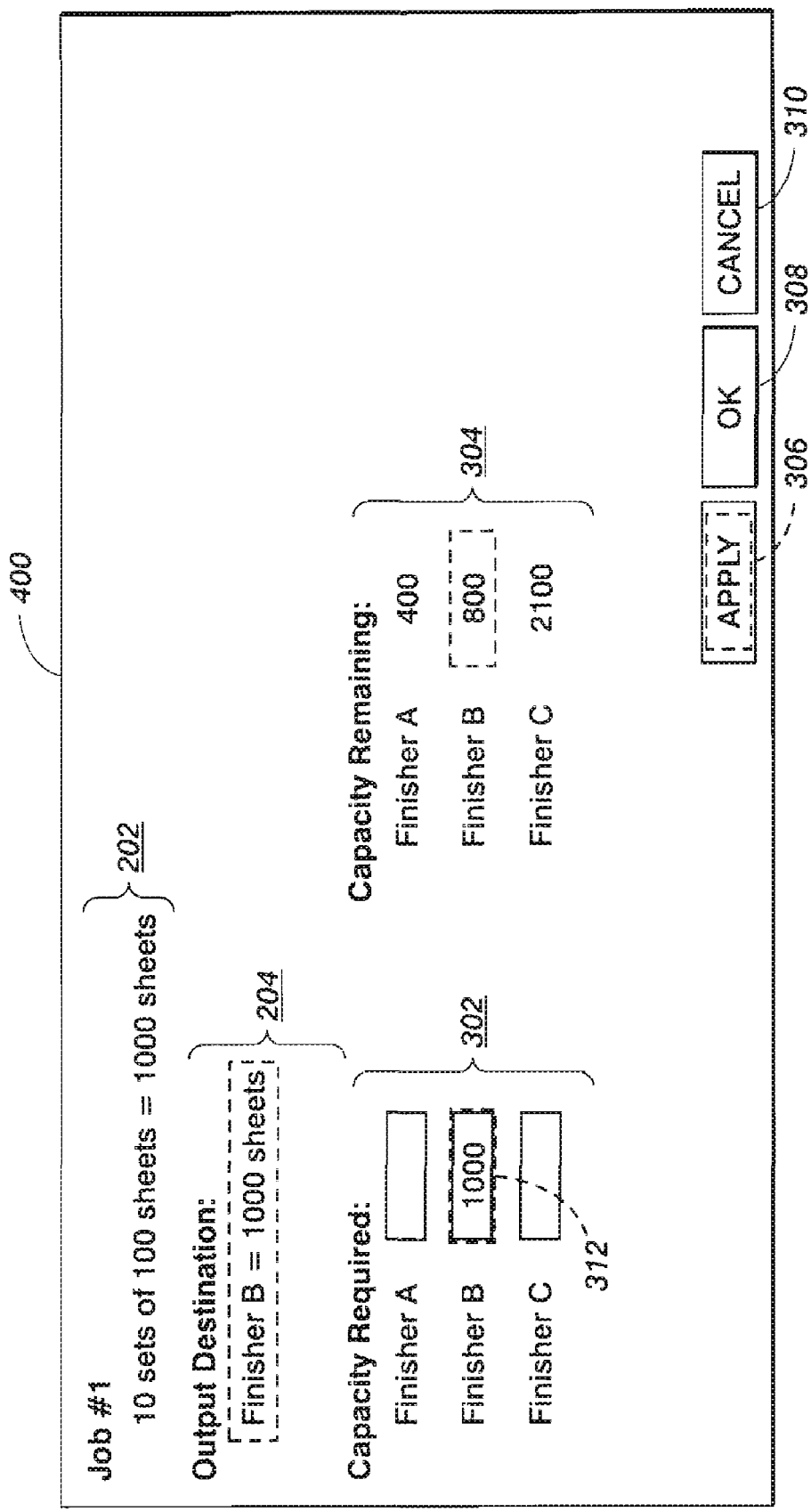

FIGS. 5 and 6 illustrate another exemplary embodiment of a job view level display 400. This display is an alpha-numeric version of the finisher capacity details at the job view level. Instead of showing information about all the jobs associated with each finisher as in FIGS. 3 and 4, only the capacity available is displayed in the capacity remaining information 304 in FIGS. 5 and 6. When the user enters, for example, 1000 sheets for finisher B, the capacity remaining for finisher B decreases from 1800 (FIG. 5) to 800 (FIG. 6).

Figure 7:
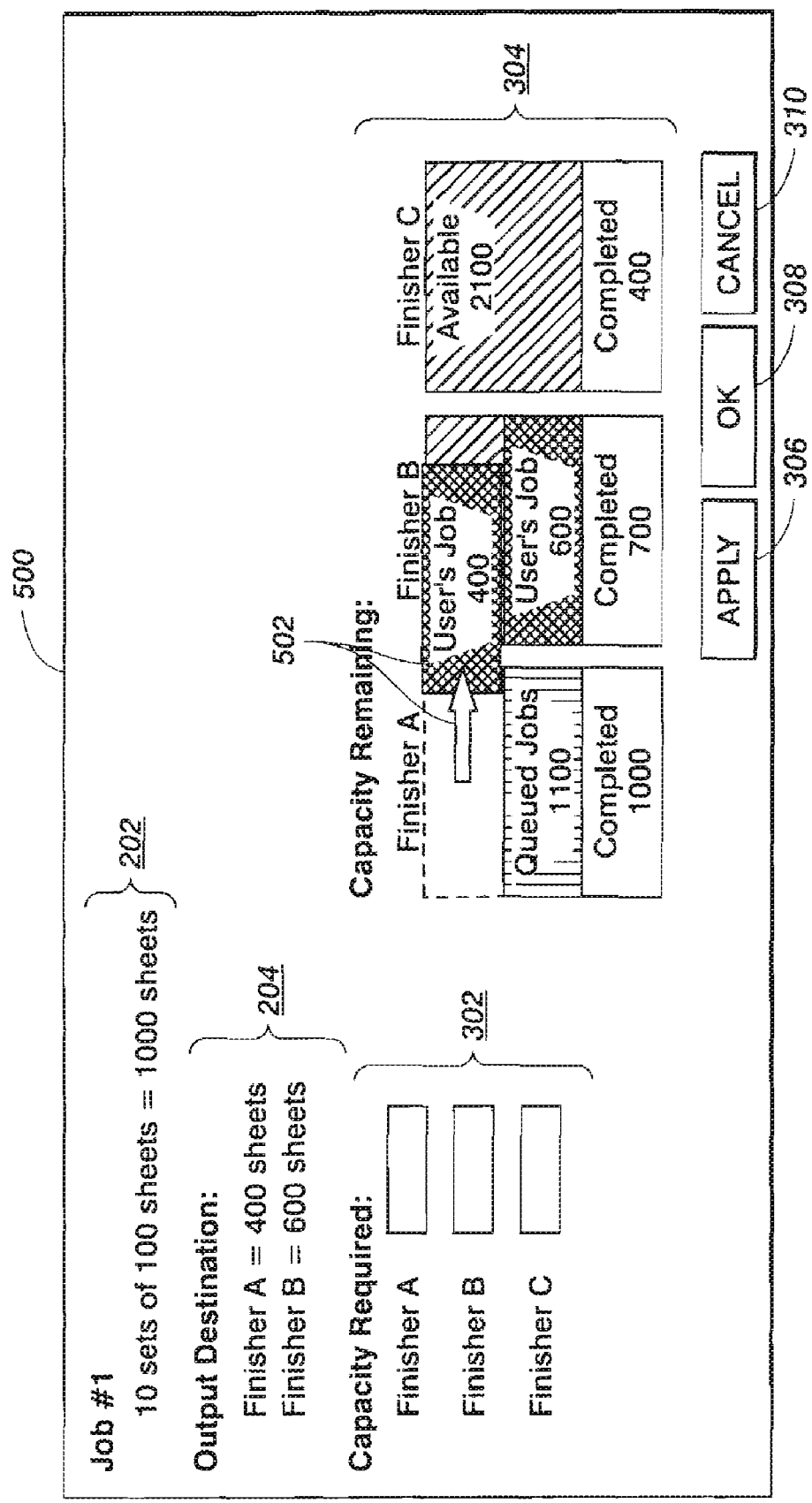
FIG. 7 illustrates an alternate exemplary embodiment of an interactive device mimic display.

FIGS. 3, 7 and 4 together illustrate an exemplary embodiment of an interactive device mimic display 300, 500. The interactive device mimic display 300, 500 is used to view and override system determined output destinations at the job view level. The user may view information about characteristics of a system, such as the finishing capacity of a printing device. The finishing capacity may be based on factors, such as current finisher capacity, active marking jobs in a queue, settings of the user's job and the like.

In this embodiment, the user may view and change the scheduled output destination while the user's job is in the job queue by directly interacting with the device mimic or another set of controls corresponding to the features of this device mimic. In FIG. 7, a direct drag and drop method of interaction is used, but other interaction methods may also be used. The user may select a portion of the device mimic that represents the output and drag it 502 (or move via some other interaction) to the output destination mimic of choice that has sufficient capacity to receive the job. Upon dropping the output capacity into another destination mimic, the affected output destination mimics are updated accordingly (e.g., increasing or decreasing capacity or displaying an error message).

In FIG. 3, the system is set to send the user's job to finishers A and B. The user wants to re-route or override the system determined output destinations of the job so that all of the output is sent to finisher B. In FIG. 7, the user chooses to have the job sent to finisher B by highlighting the mimic of the 400 sheets and dragging the mimic from finisher A to finisher B 502, to which the system already assigned 600 sheets of the user's 1,000 sheet job. In FIG. 4, the mimic now reflects the output destination for the combined job of 1,000 sheets assigned to finisher B.

Exemplary embodiments are broadly directed to various user interfaces, such as interactive device capacity mimics, to manage and control jobs on a machine by changing or overriding system determined workflow patterns. In some embodiments, the interactive device mimic appeals to various senses of the user, such as seeing, touch, hearing and the like and may combine such possible interactions to provide options for various users who may prefer certain types of interactions. Any system configured with multiple devices performing the same function may include a user interface with such as override function.

In one embodiment, an interactive device capacity mimic is used for input sources, such as feeders. For example, if a xerographic system has three feed trays with the same stock needed for a job, the system may feed from any one of the three input trays. The device capacity mimic may predict the level of stock when a pending job is processed and determine which feeders are available. The device capacity mimic may also provide a system override; for example overriding a system determination to use a single feeder with a user selection of feeding from three different feeders. Such an embodiment would allow a machine operator more control over stocking input trays with stock for jobs. For example, a user could override an auto tray switching feature by restocking an empty or low feeder and overriding the automatic switching to go back to the restocked feeder.

In one embodiment, an interactive device capacity mimic is used for color ink in a system such as a color printer or copier. In this embodiment, the system has multiple ink assemblies for each color so that when one runs out, it may be replaced with another. The interactive device capacity mimic may provide information about the colors needed in pending jobs and estimate the level of ink remaining for each color and permit the user to override ink cartridge selection determined by the system. Such an embodiment would facilitate continuous productivity and smooth operation. Other embodiments may be used for toner or other kinds of ink or colorants.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method for reassigning a job output destination, after the job output destination has been assigned by a server, the method comprising:
submitting an original job having a predetermined number of units to be output to a system comprising at least two different devices that are each capable of performing a same function, the system automatically assigning a number of units to be output to each of the at least two different devices,
obtaining an available capacity information for each of the at least two different devices, the available capacity information including the assigned number of units to be output,
creating a mimic of the obtained available device capacity on a display device for each of the at least two different devices,
wherein the mimic is a representation of at least the available device capacity and is updated in substantially real time during running of the at least two different devices, and
overriding the automatic assignment of the number of units to be output for each of the at least two different devices by changing the number of units to be output to each of the at least two different devices using the mimic,
wherein the capacity information of each of the at least two devices is updated before the override is performed and the mimic shows the updated capacity information before the override is performed, and
wherein a previously submitted job, that was at least partially split among each of the at least two different devices, is re-routed to only one of the at least two different devices.

2. The method of claim 1, further comprising:
obtaining the available capacity information at a job view level.

3. The method of claim 1, wherein the at least two devices are output devices.

4. The method of claim 3, wherein the output devices are finishers.

5. The method of claim 1, wherein the original job is a pending job in a queue and the obtained available capacity information includes at least one active job.

6. The method of claim 5, wherein the obtained available capacity information includes at least one other pending job in the queue.

7. The method of claim 1, further comprising:
predicting a level of stock of a feeder of each of the at least two different devices when a pending job is processed and determining which of the feeders are available based upon the level of stock.

8. A non-transitory computer readable medium storing instructions for performing a method for reassigning a job output destination, after the job output destination has been assigned by a server, the method comprising:
submitting an original job having a predetermined number of units to be output to a system comprising at least two different devices that are each capable of performing a same function, the system automatically assigning a number of units to be output to each of the at least two different devices,
obtaining an available capacity information for each of the at least two different devices, the available capacity information including the assigned number of units to be output,
creating a mimic of the obtained available device capacity on a display device for each of the at least two different devices,
wherein the mimic is a representation of at least the available device capacity and is updated in substantially real time during running of the at least two different devices, and
overriding the automatic assignment of the number of units to be output for each of the at least two different devices by changing the number of units to be output to each of the at least two different devices job to at least one of the devices using the mimic, wherein the capacity information of each of the at least two devices is updated before the override is performed and the mimic shows the updated capacity information before the override is performed, and wherein a previously submitted job, that was at least partially split among each of the at least two different devices, is re-routed to only one of the at least two different devices.

9. The computer readable medium of claim 8, further comprising:

updating the obtained available capacity information to show an effect of the override.

10. The computer readable medium of claim 8, further comprising:

providing available capacity information at a job view level.

11. The computer readable medium of claim 8, wherein the devices are finishers.

12. A system for reassigning a job output destination, after the job output destination has been assigned by a server, the method comprising:

an original job having a predetermined number of units to be output to the system, at least two different devices that are each capable of performing a same function, the system automatically assigning a number of the units to be output to each of the at least two different devices, a processor that obtains an available capacity information for each of the at least two different devices, the available capacity information including the assigned number of units to be output, a display device that displays a mimic of the obtained available device capacity for each of the at least two different devices, wherein the mimic is a representation of at least the available device capacity and is updated in substantially real time during running of the at least two different devices, and wherein the system is configured to allow overriding the automatic assignment of the number of units to be output for each of the at least two different devices by changing the number of units to be output to each of the at least two different devices job to at least one of the devices using the mimic, wherein the capacity information of each of the at least two devices is updated before the override is performed and the mimic shows the updated capacity information before the override is performed, and wherein a previously submitted job, that was at least partially split among each of the at least two different devices, is re-routed to only one of the at least two different devices.

13. The system of claim 12, wherein the obtained available capacity information is updated on the display device to show an effect of the override.

14. The system of claim 12, wherein the obtained available capacity information is provided at a job view level.

15. The system of claim 12, wherein the at least two devices are output devices.

16. The system of claim 15, wherein the output devices are finishers.

* * * * *